(12) United States Patent
Archer et al.

(10) Patent No.: US 10,999,440 B1
(45) Date of Patent: May 4, 2021

(54) METHOD TO AUGMENT ROUTING DELIVERY SYSTEMS WITH INTUITIVE HUMAN KNOWLEDGE, EXPERTISE, AND ITERATIVE ARTIFICIAL INTELLIGENCE AND MACHINE LEARNING IN CONTACT CENTER ENVIRONMENTS

(71) Applicant: Avaya Inc., Santa Clara, CA (US)

(72) Inventors: Kevin Archer, Brighton, CO (US); Dwayne W. Ockel, Northglenn, CO (US); Rusty G. Nelson, Brighton, CO (US); Roger I. Krimstock, Boulder, CO (US); Gregory P. Schin, Highlands Ranch, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/732,971

(22) Filed: Jan. 2, 2020

(51) Int. Cl.
*H04M 3/00* (2006.01)
*H04M 5/00* (2006.01)
(Continued)

(52) U.S. Cl.
CPC ....... *H04M 3/5233* (2013.01); *H04M 3/4933* (2013.01); *H04M 3/5175* (2013.01); *H04M 3/5231* (2013.01); *H04M 3/5237* (2013.01)

(58) Field of Classification Search
CPC .. G10L 15/00; G06Q 10/06; G06Q 10/06316; G06Q 30/016; H04L 51/02; H04L 51/046; H04L 51/24; H04L 51/30; H04M 3/2281; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233;
(Continued)

(56) References Cited

U.S. PATENT DOCUMENTS 5,982,873 A 11/1999 Flockhart et al.
6,173,053 B1 1/2001 Bogart et al.
(Continued)

FOREIGN PATENT DOCUMENTS

AU 785366 2/2007
DE 3856573 12/2005

*Primary Examiner* — Khai N. Nguyen
(74) *Attorney, Agent, or Firm* — Sheridan Ross P.C.

(57) ABSTRACT

Dynamically routing and re-evaluating a work item based on actions taken on the work item (e.g., adding context information). The augmented routing system categories a work item into one or more dynamic work categories and identifies active knowledge workers and/or knowledge articles based on the work categories. The work item is displayed in a dynamic knowledge worker view, which allows the knowledge worker to take action on the work item. The actions a knowledge worker may take are based on permissions of the knowledge worker, one of the actions that a knowledge worker may take on a work item is to add context information to the work item. After an action is taken on a work item, the system re-evaluates the work item, which may result in the work item being added/removed from one or more work categories; and added/removed from one or more dynamic customized knowledge worker views.

20 Claims, 15 Drawing Sheets

(51) Int. Cl.
*H04M 3/523* (2006.01)
*H04M 3/493* (2006.01)
*H04M 3/51* (2006.01)

(58) Field of Classification Search
CPC ............ H04M 3/5235; H04M 3/5237; H04M 3/5238; H04M 3/54; H04M 2203/40; H04M 2203/401; H04M 2203/2011; H04M 2203/2061; H04M 2242/00; H04M 2242/08; H04M 2242/12; H04W 4/14
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | | |
|---|---|---|---|
| 6,272,216 B1 | 8/2001 | Vaios | |
| 6,775,378 B1 | 8/2004 | Villena et al. | |
| 6,820,071 B1* | 11/2004 | Sullivan | G06F 16/2453 706/50 |
| 7,039,176 B2 | 5/2006 | Borodow et al. | |
| 7,110,525 B1 | 9/2006 | Heller et al. | |
| 7,904,360 B2* | 3/2011 | Evans | G06Q 20/382 705/35 |
| 8,589,271 B2* | 11/2013 | Evans | G06Q 20/10 705/35 |
| 8,917,854 B2* | 12/2014 | Castellani | G06Q 10/06375 379/265.06 |
| 10,165,121 B2* | 12/2018 | Reilly | H04M 3/5183 |
| 2001/0011228 A1 | 8/2001 | Shenkman | |
| 2002/0052913 A1 | 5/2002 | Yamada et al. | |
| 2004/0220847 A1* | 11/2004 | Ogushi | G06Q 10/06 700/100 |
| 2004/0267592 A1* | 12/2004 | Ogushi | G06Q 10/105 705/7.42 |
| 2005/0137922 A1 | 6/2005 | Blackwood et al. | |
| 2005/0222881 A1* | 10/2005 | Booker | G06Q 10/063114 705/7.15 |
| 2007/0274507 A1 | 11/2007 | Sawyer | |
| 2011/0016050 A1* | 1/2011 | Evans | G06Q 20/10 705/44 |
| 2011/0288897 A1* | 11/2011 | Erhart | G06Q 10/06 705/7.13 |
| 2013/0024916 A1* | 1/2013 | Evans | G06Q 20/401 726/5 |
| 2013/0110568 A1* | 5/2013 | Cheng | G06Q 10/06 705/7.14 |
| 2014/0074717 A1* | 3/2014 | Evans | G06Q 30/06 705/44 |
| 2014/0192970 A1* | 7/2014 | Castellani | G06Q 10/06398 379/265.06 |
| 2016/0132883 A1* | 5/2016 | Evans | G06Q 20/386 705/44 |
| 2017/0011329 A1* | 1/2017 | Tokuoka | G06F 3/14 |
| 2017/0054847 A1* | 2/2017 | Reilly | H04M 3/5183 |
| 2017/0097971 A1 | 4/2017 | Brown et al. | |
| 2017/0213171 A1* | 7/2017 | Dubash | G06Q 10/063 |
| 2020/0137232 A1 | 4/2020 | Krimstock et al. | |

* cited by examiner

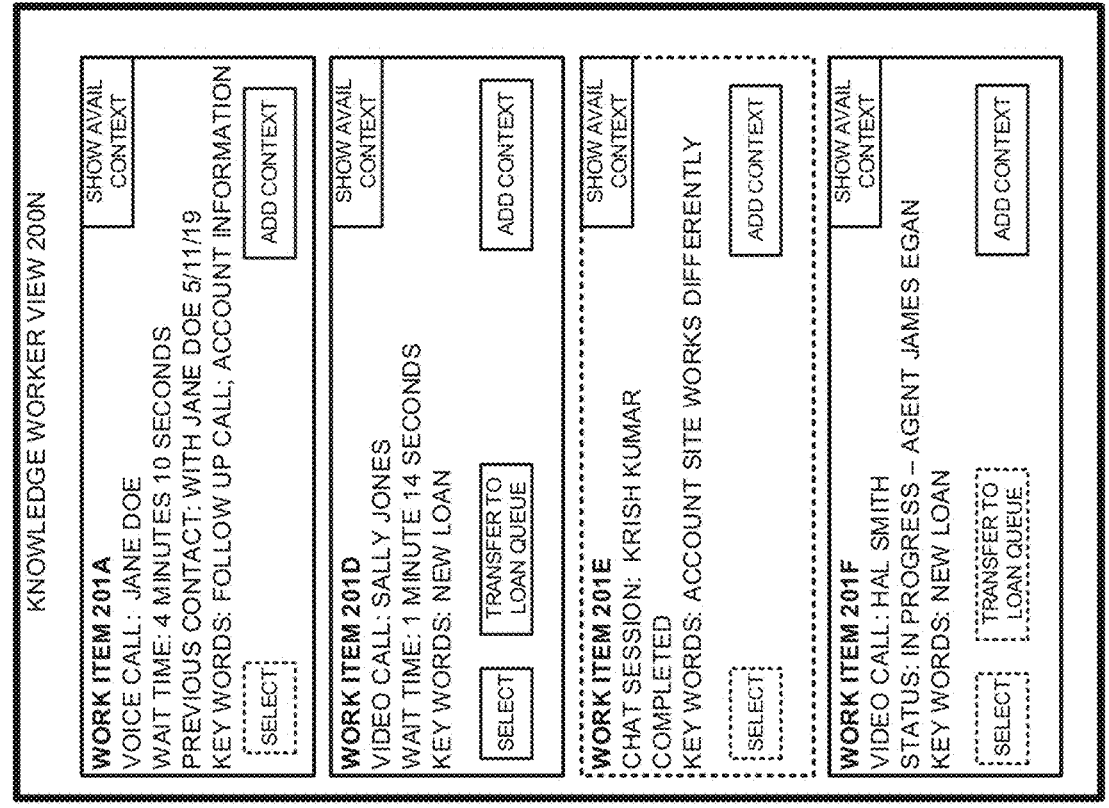
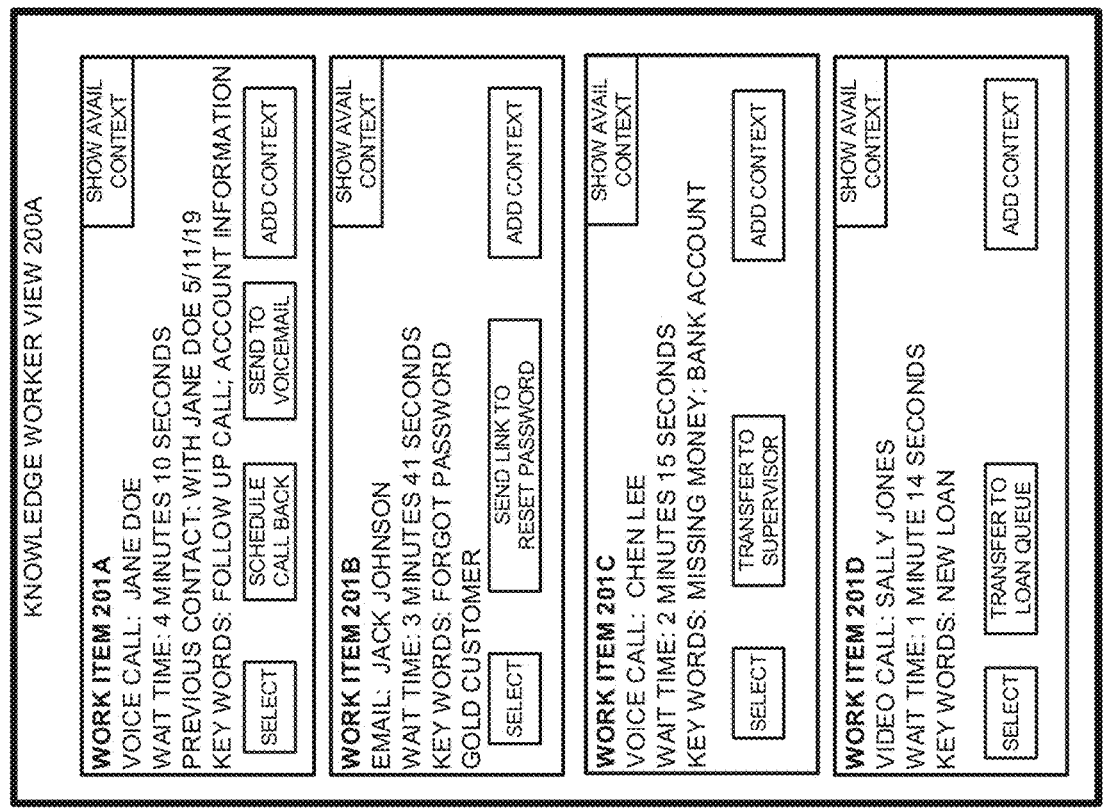
FIG. 2

Work Item #711 Context Detail

CURRENTLY WORKED BY: KW 600B
VOICE CALL: JANE DOE
WAIT TIME: 4 MINUTES 10 SECONDS
PREVIOUS CONTACT: WITH JANE DOE 5/11/19
KEY WORDS: FOLLOW UP CALL; ACCOUNT INFORMATION

Additional Freeform Context:
Customer previously called regarding end of promotions..... *Discussed with John Doe*

Reference Knowledge Article | Attach Link | Associate Related Work Item

Priority: 3 - HI

Cancel | Update and Assign | Update Context Information

FIG. 7C

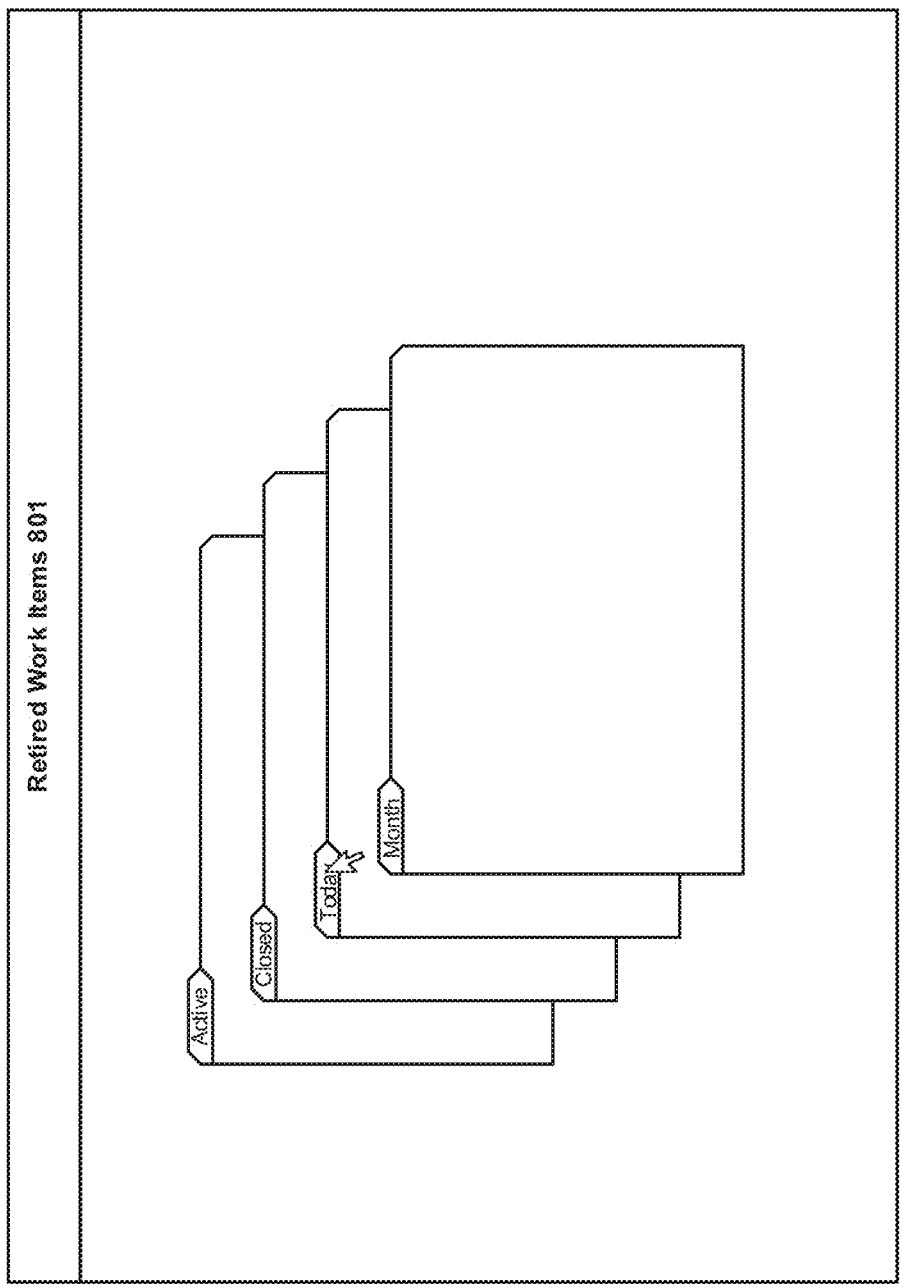

Today

WI #611 (ACME Company / Jane Doe XXX-XXX-XXXX / KW 600B Resolved 10/1/2019 14:22:33 / Solution Provided CONTEXT: Customer previously called regarding end of promotions.... Discussed with John Doe

[CALL CUSTOMER] [ADD CONTEXT] [REMOVE FROM AI] • • • [GENERATE KA TEMPLATE] [PRINT REPORT]

---

WI #613 (Joe's Office Supply / Frank Johnson XXX-XXX-XXXX / KW 600C Resolved 10/1/2019 15:33:44 / KA emailed CONTEXT: Customer needs help with AB500 series copier -- error code 9999

[CALL CUSTOMER] [ADD CONTEXT] [REMOVE FROM AI] • • • [SHOW LINKED KA] [PRINT REPORT]

• • •

---

WI #687 (AAA Auto / Larry Brown XXX-XXX-XXXX / KW 600N Resolved 10/1/2019 23:58:44 / Replacement Shipped CONTEXT: Customer needs replace (warranty) product XY123 -- KW 600E recommended free upgrade to XY133

[TRACK SHIPMENT] [CALL CUSTOMER] [ADD CONTEXT] [REMOVE FROM AI] • • • [CONTACT KW 600E] [PRINT REPORT]

FIG. 8B

METHOD TO AUGMENT ROUTING DELIVERY SYSTEMS WITH INTUITIVE HUMAN KNOWLEDGE, EXPERTISE, AND ITERATIVE ARTIFICIAL INTELLIGENCE AND MACHINE LEARNING IN CONTACT CENTER ENVIRONMENTS

FIELD

The disclosure relates generally to contact centers and particularly to systems and methods for routing work items in a contact center.

BACKGROUND

A contact center is a set of systems and services for interacting with customers and/or potential customers of a business entity. For example, a typical contact center allows users to communicate via different channels such as voice/video calls, video messages, text messages, emails, chat, instant messages, etc., with any of a variety of different resources of the contact center such as human agents, interactive voice response (IVR) systems, chatbots, online libraries, etc. In many cases, these users are identified by the contact center by some identifying information related to a channel though which they have made contact, e.g., a phone number, email address, IM username, etc.

Contact centers routinely attempt to ascertain the identity of a caller, leverage whatever information is known about the caller, and then make a decision on how to best provide a differentiated customer-experience. This model works moderately well for existing customers for whom historical information is stored in a Customer Relationship Management (CRM) system or some other transactional application, which can be accessed at the time of the call. Attributes of the caller and/or work item are used to provide optimal matching of customers to agent/resources.

Even when additional information about the caller is known, contact centers typically use static/pre-configured routing mechanisms to route these callers. For example, a contact center may have static/hard-coded routing models and pre-defined skill groups/contact center queues that handle communications coming into the contact center. Incoming communications, such as voice calls, are routed based on predefined skill groups/contact center queues and manual determination of intent. In skilled-based and attribute-based routing mechanisms, the requirements of the contact center are categorized and programmed ahead of time into routing algorithms. Modifications may be made retroactively based on historical data.

However, static/hard-coded routing models may not always provide the most efficient, or best match routing of communications in a contact center. In addition, these fixed routing models are often difficult to quickly reconfigure and adapt.

SUMMARY

These and other needs are addressed by the various embodiments and configurations of the present disclosure.

The present disclosure can provide a number of advantages depending on the particular configuration. In some configurations, the augmented routing system may be added to an existing routing system to route digital communications. In other configurations, the augmented routing system may be implemented as the sole routing system for the contact center.

The augmented routing system allows a specific and focused set of work items to be presented to a variety of knowledge workers in the contact center based on their specific role/function in the business (e.g., work item categories). In addition, the work item categories and the knowledge worker views are dynamic, work item categories and work items may be re-evaluated whenever context is added to the work item (and/or other action is taken on the work item (e.g., transfer, select, retire, etc.).

The present disclosure leverages the knowledge, experience, and expertise of the knowledge workers in a contact center and allows for a highly adaptable and flexible system of categorizing and routing working items. In addition, the present disclosure utilizes Artificial Intelligent (AI) and/or Machine Learning (ML) to continuously and dynamically improve the handling of work items. For example, AI and/or ML may be used to dynamically determine work item categories.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 2 is a block diagram of example knowledge worker views in accordance with the present disclosure.

FIGS. 7A-D illustrate an example embodiment illustrating an action sequence for a contact center using augmented routing in accordance with the present disclosure.

FIGS. 8A-B are related to retired work items and adding context after a work item has been retired in accordance with the present disclosure.

DETAILED DESCRIPTION

Figure 1A:
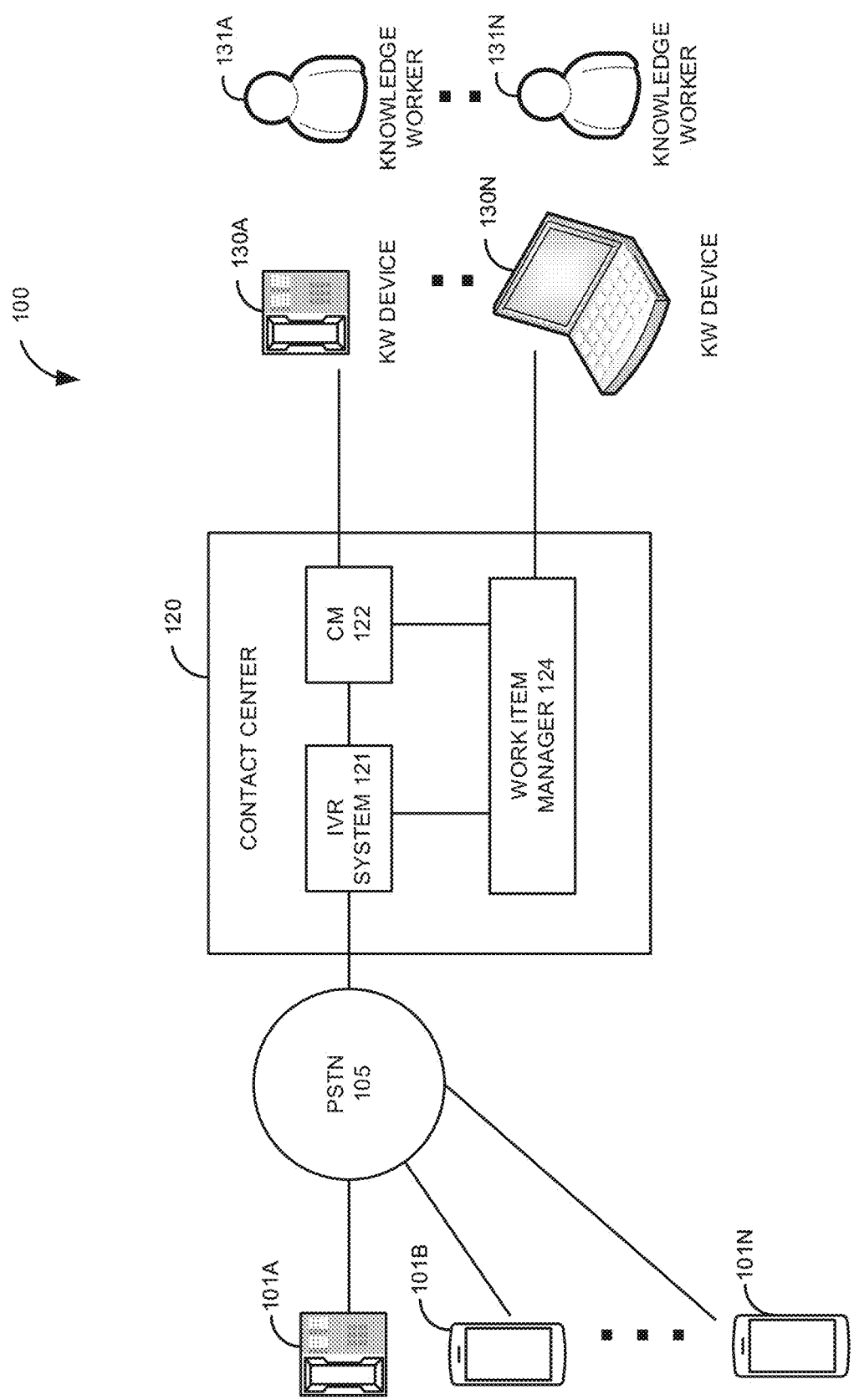
FIG. 1A is a block diagram of an illustrative system to augment routing with context and iterative artificial intelligence learning for voice calls in contact center environments.

Typical contact centers today have a model where a processor pre-determines information about a work item and uses the associated information with pre-configured routing rules to route the item to the closest matching available agent and/or knowledge worker capable of handling the work item, such as in skills-based/attribute-based routing algorithms. For example, an Interactive Voice Response (IVR) system may gather information about a work item and then the gathered information is used to determine attributes for the work item and those attributes may be matched to a knowledge worker with the best matching attributes. Such systems assume that all of the requirements of a contact center can be categorized and hardcoded ahead of time and that perfect information is available to the algorithms used in these methodologies. The term knowledge worker or agent may be used to refer to the same individual within a contact center. That is to say, in some instances an individual may be more knowledgeable about the subject matter and therefore may be considered a knowledge worker while in other instances the same individual may not have specialized knowledge/expertise and therefore be considered an agent. The term knowledge worker is used herein to express the idea that a given individual may have specialized knowledge/expertise to add context information to a give work item.

Sometimes, this processing includes human interaction, often in the form of an agent attendant performing triage operations on work items. While these systems generally function well when properly configured and administered, no amount of automation or preliminary triage can completely replace the expertise, knowledge, insight, and intuition of experienced workers in the contact center. This includes agents, supervisors, managers, etc. These "knowledge workers" can add an additional layer of processing that can improve contact center operations both in real-time and through systematic observations (e.g., AI and machine learning) of their work item interventions as described below. Implementing AI and ML the system improves and learns how to better manage work items. Furthermore, triage is generally only performed at the first level of routing.

This judgement and reasoning are very difficult to create artificially and thus to implement systematically or programmatically. Further, where human intervention in the process does exist, it tends to exist in the form of simple triage, re-ordering, or selective pairing of work items with agents. While sometimes useful, these activities fall far short of utilizing the talent, skills, and expertise, implicit within knowledge workers throughout the contact center.

Unlike traditional work assignment systems, which typically present each agent with a view of work items in a particular queue, where each agent sees the same set of work items for an assigned queue/attribute(s), in an augmented routing system, each knowledge worker is presented with a customized view of work items based on the context information associated with the work items. That is to say, each knowledge worker may be presented with a different set of work items and/or may have different available actions to perform on the displayed work items. Furthermore, the context information available/displayed to each knowledge worker may vary based on the knowledge worker. For example, if the context information includes confidential information, such confidential information may only be displayed to certain knowledge workers authorized to access such information.

In regard to a customized view of work items, one knowledge worker may be presented with work items A, B, C, and D; while another knowledge worker may be presented with work items B. D. E. and F; and yet another knowledge worker is presented with work items A, C, and E. As illustrated in this example of work items sets, none of the sets have complete overlap (although this is not required). Furthermore, although work item A is in two of the work item sets, the available actions to be performed on work item A (e.g., transfer, select, send to IVR, etc.) may be based on the knowledge worker viewing work item. For example, one knowledge worker may have permissions to transfer work item A, while another knowledge worker may not have the ability to transfer work item A.

Furthermore, the customized view is not static, but dynamically changes in response to actions taken by the knowledge workers, or other automated aspects of the system, against the work items throughout the lifecycle of the work items. For example, when context information is added to a work item, the system re-evaluates the work item and may re-categorize the work item, which may change which knowledge workers the work item is presented to. In other words, context information may be added to a work item at any stage of the work item's lifecycle. That is to say, context information may be added even after a work item is completed/retired. For example, a knowledge worker may go back and review her own work items to add additional context information, in some embodiments, a knowledge worker may review work items belonging to other knowledge workers and add context information. Even though this context may be added after the work item is retired, it may affect how another work item is treated based on the system's evaluation of the retired work item's context. The system may use AI/ML to process work item(s) history (e.g., who worked on the work item, how was it resolved, context information, etc.) to improve the system's routing of new work items. This is one way the work item categories may dynamically change. Based on the handling of a retired work item, a future work item that is similar to the retired work item may be routed similarly. For example, if the retired work item was initially assigned to one or more work item categories, and then context information was added that changed the one or more work item categories associated with the work item, which ultimately resulted in the resolution of the work item by a knowledge worker not initially identified by the system, the future work item may be directly routed to the work item category that resulted in resolution of the work item. That is to say, the system dynamically adapts (e.g., without human intervention) and is able to change the routing of work items based on processing previous work items. In another example, if a retired work item resulted in the creation of a new work item category, the new work item category is available for similar future work items, without the new work item category needed to be manually added to the system (e.g., hard-coded by a human).

Each action taken by a knowledge worker or the system causes the work item to be re-evaluated by the routing/work item manager/AI system, which may change the set of work items displayed to a particular knowledge worker/work item pool/work item group and/or may add/remove that particular work item to/from other knowledge workers. In other words, when context information is added to a work item (or other action is taken), the work item is re-evaluated by the system and may be removed from the view of one knowledge worker (or subset of knowledge workers) and added to the view of another knowledge worker (or subset of knowledge workers).

The system allows for the potential actions of knowledge workers to extend beyond simply assigning a work item (e.g., taking ownership of or transferring to another queue/work group), it allows for real-time augmentation of information/characteristics/context of work items, even without the knowledge worker who is augmenting the context having to take ownership of, or directly interact with the work item. That is to say, a knowledge worker does not have to select the work item for handling in order to add context information. Alternatively, or in addition, a knowledge worker may add context to an active work item (e.g., a work item currently being handled/answered by another knowledge worker).

The system allows knowledge workers to add human judgement and reasoning to existing routing and workflow management techniques that can be immediately applied as well as learned by an AI system for continual improvement. Compared to traditional hard-coded systems, knowledge workers are faster to adjust to changing scenarios because they possess intrinsic and intuitive information about unique business operations that cannot be easily captured in traditional routing algorithms.

The system includes an iterative AI and machine learning process. Instead of a programmed set of rules to match work items with knowledge workers, the system dynamically re-evaluates the state of a work item (e.g., work item categories) whenever a knowledge worker (or the system) adds context information to the work item and/or performs an action on the work item. Thus, the system is highly dynamic with knowledge workers seeing updated information on work items as the work items change in real-time, giving the knowledge workers the ability to provide knowledge, insight, intuition, context, and other unique qualities that can result in highly enhanced handling and ultimate resolution of work items. The AI learning allows the system to learn from the context information to continually improve its work item engine/processing rules. One example of this is the automatic evolution of work item categories. For instance, if the call center for cars had initial work item categories for fuel powered cars and electric cars, but system determines the work item category for fuel powered cars should be further broken down into gasoline and diesel, then new work item categories for gasoline and diesel will be added/created.

In current systems, where basic human interaction in work item assignment and resolution exists, it tends to be in the form of pre-processing attendant console operations where an operator or supervisor monitors queue(s) of waiting work items, and intervenes along dimensions such as customer status/priority, previous work item/agent relationships, and other high-level characteristics known to the attendant (e.g., adding additional agents, moving agents to different queues/work groups), the current systems are unable to harness the rich, deep knowledge of the knowledge workers in the contact center, many of whom have expertise that is not otherwise represented within the system.

Furthermore, currently, such human intervention tends to happen early in processing/routing, typically at work item inception (i.e., when the work item is received in the contact center) and are not revisited with continual changes in information and context of the work items (one of the powerful aspects of the invention is the ability to continuously re-evaluate work items as the context of the work item changes), which may result in changes in the routing of the work item (e.g., dynamic knowledge worker work item views). Also, work item context may be added at any stage of the lifecycle of a work item, even after the work item has been marked completed/retired).

Each knowledge worker may view a different set of work items (based on context information). The set of work items may change as context information is added or changed (or other action is taken on a work item). Additionally, each knowledge worker may have a different set of actions available to perform on each work item (e.g., select, add context, transfer, etc.). The set of actions available may be work item dependent (e.g., a knowledge worker cannot select a work item that has already been selected). In addition, the set of available actions may vary depending on the knowledge worker (e.g., a supervisor knowledge worker may be able to transfer a work item, but a regular knowledge worker may not have the ability to invoke that functionality). Each knowledge worker may be assigned a set of permissions which affect their ability to take specific action(s) against work items.

Human knowledge workers can apply reason and instinct to situations that have not been seen before, while algorithms require pre-programming or learning. Since the knowledge workers may initially have intuitive information which the algorithms lack, this invention capitalizes on context information-based processing of work items. Advances have been made in attribute and skill-based routing, but knowledge workers still have an advantage in applying near instantaneous decisions based on both the contextual information contained in the work item and business operations, combined with their own expertise, knowledge, insight, and intuition. Further, attendant systems that utilize human intervention in work item processing, delivery, and resolution are typically primitive and take place only at the inception/routing or early lifecycle of the work item, usually as a triage exercise, whereas the augmented routing system iteratively re-evaluates work items as context information is added to the work item. That is to say, the system learns from the knowledge workers and is able to adjust the system (e.g., routing/work item categories) based on what is learned.

Also, current systems generally present for consideration the same set of work items to knowledge workers based on a set of inelastic rules or attributes that force the grouping of knowledge workers along dimensions that are often insufficient to represent the true diversity of their skill sets. The augmented routing systems refine the level of resolution for these groupings all the way down to the level of the individual knowledge worker. In other words, every knowledge worker may be presented with a different set of work items for consideration, without the need for complex and administratively demanding configuration. Additionally, as the system continues to process and resolve work items, the quality of these sets improves as the system learns which resources are most effective in resolving the problem sets presented to it and learns via dynamic knowledge articles generated from dynamic context. That is to say, the system applies machine learning to the handling of past/retired work items to route new work items.

The knowledge worker views may vary from each knowledge worker (i.e., each knowledge worker sees a customized set of work items and the views are dynamic (i.e., updated whenever an action is taken on a work item (e.g., adding context information)). Consequently, different knowledge workers may be presented with different lists of active/waiting work items. Additionally, the actions a knowledge worker may take on a work item varies based on the knowledge worker. Some examples of actions that may be taken on the work items presented to the knowledge worker include, but are not limited to: self-selecting the work item, thus pulling it from the pool, regardless of its position for immediate handling by the knowledge worker; directing the work item to a specific knowledge worker, which the knowledge worker inherently understands to be the best match given the current dynamic conditions in the contact center; directing the work item for further automated processing, such as additional automated routing, an IVR system to gather additional information from the contact initiator, or an expert system that the knowledge worker inherently understands to be able to address the initiator's reason for contact, based on the context and information presented to the knowledge worker; rerouting the work item, thus overriding the preceding automated decision flow, again based on the inherent understanding of the knowledge worker; escalating a work item to a higher level of handling (e.g., supervisor intervention, specialized departments with higher skilled knowledge workers, customer retention specialists, etc.); attaching to the work item additional context information, characteristics, etc. This may result in the work item being reprocessed/re-evaluated or may simply provide the eventual handler of the work item with additional valuable information about the work item or initiator that they would not otherwise have had. The system processes the handling of each work item to refine routing of future work items. In other words, future work items that are similar to retired work items may be categorized into the same work item categories. The system may determine a level or similarity and the overlap of work item categories between the retired and new work item may be based on the level of similarity. For example, work items may be from callers from the location that is within a certain proximity. Another similarity may be other demographics of the caller. However, the retired work item may be associated with an existing customer while the new work item is associated with a new customer, therefore, some of the work item categories may differ between the retired work item and the new work item.

The system would be constantly iterative in that every time an action is taken on a work item (e.g., adding context information) by a knowledge worker (or the system), the system may re-evaluate the state of a work item (and/or others) in the system. Possible actions include but are not limited to: offering a callback to a customer who has been waiting a certain amount of time; engaging a supervisor or escalating to a higher level of support; engage in team formation, gathering the appropriate knowledge workers necessary to resolve an issue recognized by the system; interface with other business systems to take such actions as creating a ticket in a ticketing system, displaying a message to a wallboard, interfacing with a workforce management system to enlist more on-demand help, etc.

As a result, perhaps a new knowledge worker who had not been previously engaged could add invaluable assistance to a work item resulting in a radically improved disposition whereas that knowledge worker may never have been aware of the work item in the traditional systems previously described. For example, a knowledge worker adds context information to a work item that causes the system to re-evaluate the work item, which results in the work item being displayed to a knowledge worker that was previously unaware of the work item (e.g., the work item was not in that knowledge worker's view), after the re-evaluation the work item is included in the knowledge worker's view and the knowledge worker is able to select the work item and/or add additional context information to the work item.

In addition to the dynamic intervention by knowledge workers as described above, this system further lends itself to the use of Artificial Intelligence (AI)/Machine Learning (ML) techniques. The context information may be processed to generate knowledge articles accessible to other knowledge workers. Particularly, the system, having access to the insight brought to bear by various knowledge workers over a period of time, can adapt its automated routing models based on learned behaviors from these interactions. As more observations are made, the more the system learns about various aspects of the contact center operations and learns about the business, allowing it to make adjustments such as, but not limited to: altering routing models after learning that the current state routes work items with a particular characteristic to the wrong subset of knowledge workers; learning the preferred set of knowledge workers for a particular work item initiator so that future work items from the same initiator can be preferentially handled by said knowledge workers; learning that certain work items, as currently constituted when delivered to knowledge workers, lack sufficient information for efficient handling, and thus, as an example, prompting the initiator for the further information needed; discovering patterns in certain work items that might indicate certain business issues related to a particular product or service. For example, knowledge workers are noticing a particular product or service name in work items context and intervening with pulling those work items and redirecting them to a Return Merchandise Authorization (RMA) department.

Consider this as a form of ongoing training for the AI/ML system, such that each input by a knowledge worker further refines the AWL system. The next time a similar situation occurs, the AI system may no longer need to consult with a knowledge worker for that aspect (the system may automatically serve the contact) but may consult with a knowledge worker on some new aspect that has not been considered yet. On the other side of the coin, it is often noted that some form of bias may be present in the training data and that bias may result in less than optimal results. Therefore, as part of this disclosure, there will be continual data analysis using advanced statistical methods to validate and further refine the approach last taken versus alternative approaches taken in the past. In addition to consulting with knowledge workers in real time, the system may proactively consult with the expert knowledge workers to help further refine historical information so future events may be handled more optimally.

The refined AI/ML, system from various sites within the company may be combined and aggregated into a companywide or even a cross company system that may be beneficially promoted in a partially or fully shared cloud environment.

The present disclosure augments automated routing methods with an additional, powerful, human factor (or human sensor in AI terminology).

In an example, a healthcare company has a "high touch" contact center service that they offer. VIP customers call in with issues regarding critical equipment that may be used in life or death situations. These calls should be triaged immediately and answered as soon as possible but must also be answered by knowledge workers that are trained and certified in the equipment in question. A traditional contact center model would place the critical call in a queue, possibly with high priority, and wait for the next available knowledge worker. A knowledge worker capable of quickly resolving the issue may be available but have no idea that a critical issue is waiting and may not take appropriate action to make themselves available. In the present disclosure, knowledge workers may see all calls in queue and details about those calls. A knowledge worker may choose to wrap up his current call more quickly or decide to put the current work item on hold and take the most critical call. Furthermore, a knowledge worker who may not otherwise normally handle work items (say an engineer who designed the critical system in question), may be advised by the system of the situation and get involved, adding context information that may resolve the issue. The inverse is also true. The knowledge worker may choose to spend more time on her current call to increase customer satisfaction if no critical calls are in queue. Giving knowledge workers the ability to view all the calls in queue allows knowledge workers to make necessary adjustments to handle the current situation. Additional treatment can be taken based on attributes of the call, such as sending the call to a different queue or to an IVR to collect more information.

FIG. 1A is a block diagram of an illustrative system of 100 for delivering voice calls in a contact center 120. The illustrative system 100 comprises user communication devices 101A-101N, a Public Switched Telephone Network (PSTN) 105, a contact center 120, knowledge worker communication devices 130A-N, and knowledge workers 131A-N. Contact center 120 includes Interactive Voice Response (IVR) system 121, CM 122, and work item manager 124.

The user communication devices 101A-101N can be or may include any communication device that can communicate on the PSTN 105 to make a voice call, such as a telephone, a conferencing system, a cellular telephone, a smart phone, and/or the like. As shown in FIG. 1A, any number of user communication devices 101A-101N may be connected to the PSTN 105. The knowledge worker communication devices 130A-130N may be similar devices to the user communication devices 101A-101N. The knowledge worker communication devices 130A-130N may comprise multiple communication devices (e.g., a telephone and personal computer) for each contact center knowledge worker 131A-131N.

The PSTN 105 can be or may include any collection of communication equipment that can send and receive voice communications.

For example, a customer may use the user device 101A to initiate a voice call over the PSTN 105 to the contact center 120. The voice call may be routed to the IVR system 121 for initial processing. The IVR system 121 may determine the proper department (e.g., billing, technical support, etc.) to route the voice call. The information gathered by the IVR system 121 is sent to the CM 122, which routes the voice call to a knowledge worker (e.g., knowledge worker device 130A associated with knowledge worker 131A). In parallel, the IVR 121 transfers the IVR data to the work item manager 124, which determines one or more work item categories for the voice call. The work item manager 124 selects one or more knowledge workers (e.g., knowledge worker 131N) based on the determined work item categories and displays the work item (e.g., voice call) on the knowledge worker communication device 130N. If the knowledge worker 131A answers the call before the work item manager displays the work item, the work item state will reflect that the call has been answered (e.g., "owned") and may not be selectable by other knowledge workers. However, other knowledge workers may still take other actions on the call. In other words, knowledge worker views displayed to knowledge workers may include active calls.

Figure 1B:
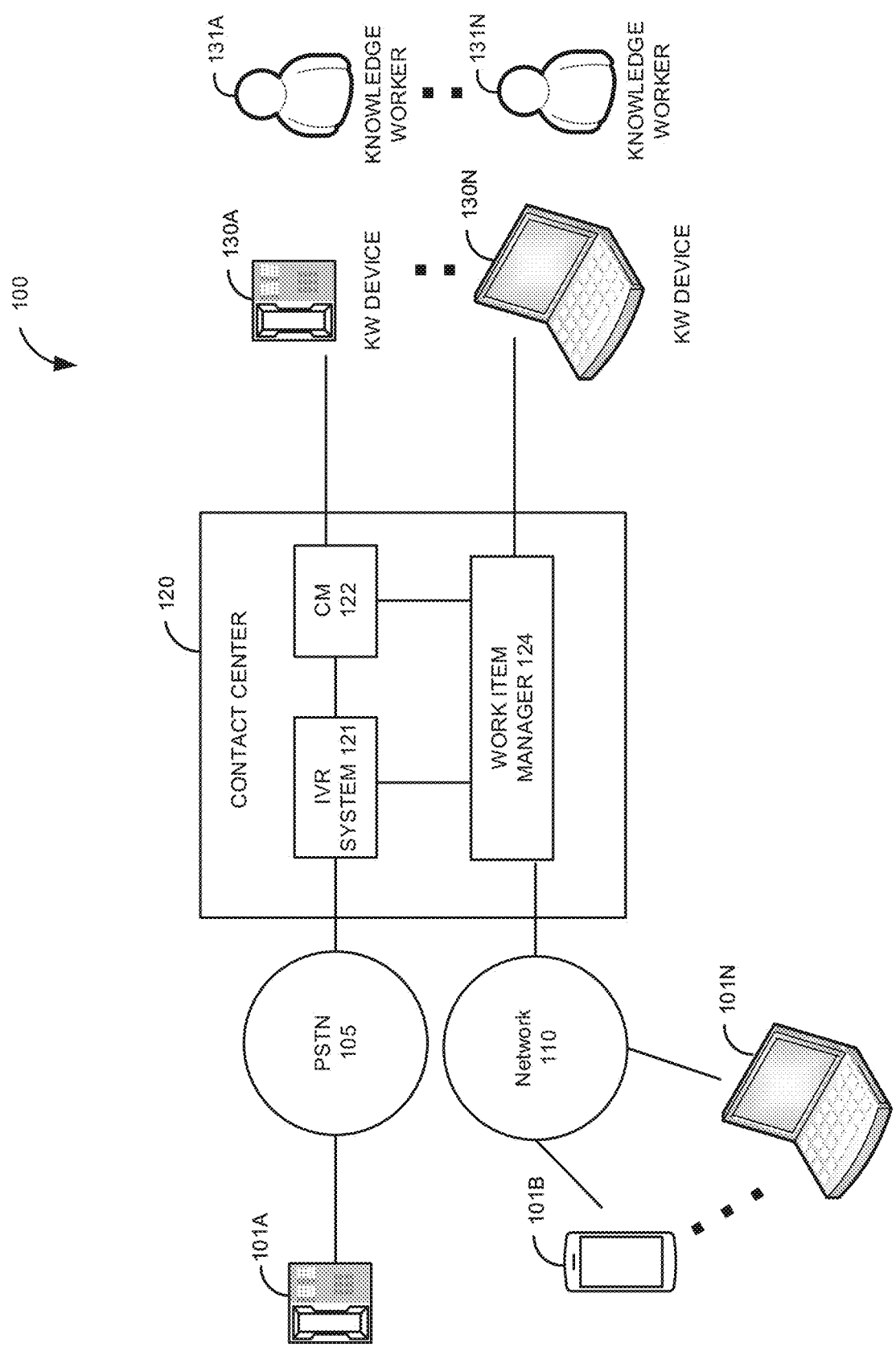
FIG. 1B is a block diagram of an illustrative system to augment routing with context and iterative artificial intelligence learning for multi-channel (e.g., digital and voice) contacts in contact center environments.

FIG. 1B is a block diagram of an illustrative system of 100 for delivering multi-channel (e.g., voice and digital) contacts in the contact center 120. In addition to the user communication devices 101A-101N, the PSTN 105, the contact center 120 (including the IVR system 121, the CM 122, and the work item manager 124), knowledge worker devices 130A-N, knowledge workers 131A-131N, FIG. 1B includes network 110 for transmitting digital-channel contacts (e.g., email, video, chat, text messages, etc.). The network 110 may include any collection of communication equipment that can send and receive digital communications such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging (IM) protocols, text messaging protocols, and/or the like. Thus, the network 110 is an electronic communication network configured to carry messages via packets and/or circuit switched communications.

For example, a customer may initiate a chat session using user device 101B over the network 110 with the contact center 120. The chat session is routed to the work item manager 124, which may include a chat bot system to gather initial information from the customer. The work item manager 124 routes the chat session to the knowledge worker 131N using knowledge worker communication device 130N.

Figure 1C:
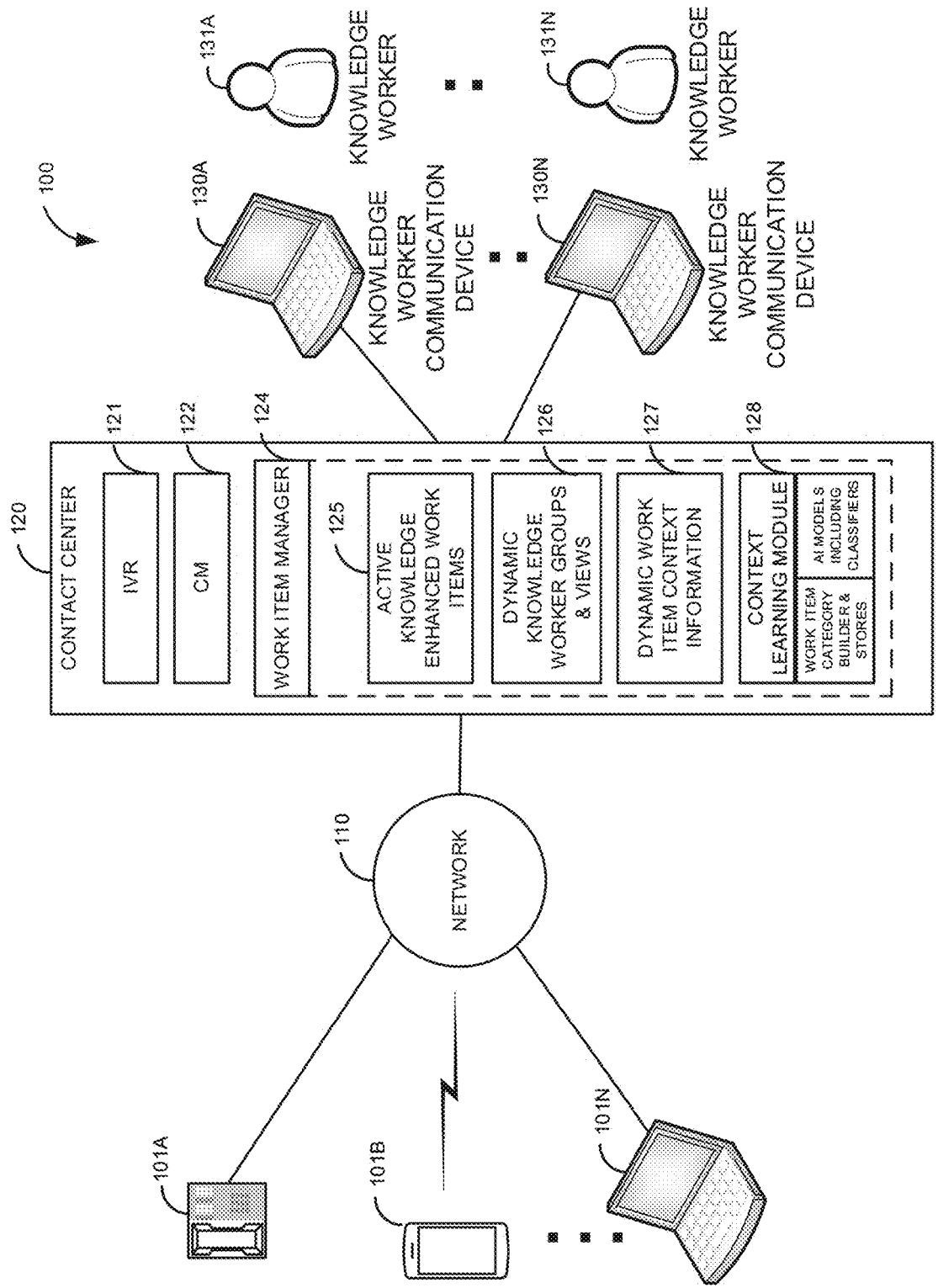
FIG. 1C is a more detailed block diagram of the system to augment routing with context and iterative artificial intelligence learning in contact center environments.

FIG. 1C is a more detailed example of system of 100 for augmenting delivery of work items in the contact center 120.

The contact center 120 comprises IVR 121, CM 122, work item manager 124, which comprises active knowledge enhanced work item(s) 125, dynamic knowledge worker group(s) and view(s) 126, dynamic work item context information 127, and context learning module 128. In some examples, the augmented routing delivery system may be incorporated into the existing routing system in a contact center. In examples, such as integration of the claimed invention into contact centers, the IVR systems 121 and a communication manager 122 may handle the routing for voice calls. Contact center 120 may include a network (not shown) to connect to the knowledge workers communication devices 130A-130N. In other examples, the augmented routing delivery system of the present disclosure may comprise the routing system for voice and digital communications (e.g., video, email, chat, etc.) for a contact center.

The contact center 120 can be or may include any hardware coupled with software that can manage routing incoming and/or outgoing communication sessions between the user communication devices 101A-101N and the knowledge worker communication devices 130A-130N. The knowledge worker communication devices 130A-130N in the contact center 120 may be remote devices. For example, a contact center knowledge worker 131 may use a Virtual Private Network (VPN) communication session to connect to and be part of the contact center 120.

The contact center 120 may route various types of communication sessions, such as voice communication sessions, video communication sessions, Instant Messaging (IM) communication sessions, text messaging (SMS/MMS), email communication sessions, chat communication sessions, social media communication sessions, virtual reality communication sessions, and/or the like. For example, a work item, such as a voice call may come into contact center 120, the voice call will be handled by the IVR system 121 and CM in parallel with the work item manager 124. In some aspects, before the work item is sent to the communication manager, the work item may be processed using the IVR system 121 to gather information on the work item. For example, the IVR system 121 may gather information such as which department (e.g., account information, technical assistance, etc.) to route the work item. The IVR system 121 then sends the data gathered about the work item and the call to the communication manager. The IVR 121 also transmits the IVR data to the work item manager 124 (e.g., via REST API) for parallel processing. In some embodiments, the functionality of the IVR 121 may be incorporated into the CM 122. In some embodiments there may also be a communication link between the CM 122 and the work item manager 124 (may be one direction or bi-directional). The work item manager 124 classifies the work item using work item categories, identifies active knowledge worker(s), and displays the work item to the identified knowledge workers in a dynamic knowledge worker view(s) 126. In some aspects, later handling of the work item may send the work item back to the IVR system 121.

For example, a voice call may be initially routed from the communication endpoint 101A to the IVR system 121. The IVR system 121 may collect information from the caller. The voice call and the information gathered by the IVR system 121 is sent to the communication manager and the work item manager 124. The communication manager routes the voice call to the knowledge worker 130A. The pertinent data/context information of the voice call (including intent) is also sent to the work item manager 124, which associates the voice call with one or more work item categories, based on the associated work item categories, the work item manager 124 identifies one or more active knowledge workers and adds the voice call to dynamic knowledge worker group(s) and view(s) 126 for the identified knowledge workers. In other words, the architecture provides for parallel handling of a voice call, by the communication manager and the work item manager. The communication manager and the work item manager are able to communicate state and disposition of work items to the other. For example, when the work item manager detects a knowledge worker has selected a work item, a message is sent to the communication manager to remove the work item for the queue. Conversely, if the communication manager delivers the call to an agent (e.g., call connected to agent), the communication manager informs the work item manager so that the state of the work item can be updated. In other words, certain actions (e.g., select) may not be available for other agents' active calls.

In some examples, the voice call may appear in one or more dynamic knowledge worker views although the voice call has been answered by a knowledge worker, When the voice call is taken by a knowledge worker, the "select" action is removed from the available actions (e.g., may be grayed out), but, other options remain, including the "add context" action. In other words, a knowledge worker may add context to the voice call while it is being handled by a different knowledge worker. After the knowledge worker adds the context information, the work item manager 124 re-evaluates the work item, the re-evaluation may result in the voice call being presented to different knowledge workers or the same set of knowledge workers.

The routing/business rules are rules that define different routing behaviors (and/or knowledge worker behaviors) and/or business rules that may occur on the contact center 120. The routing/business rules may be user defined rules, predefined rules, and/or auto-generated routing/business rules. For example, the routing/business rules may be automatically generated using Artificial Intelligence (AI) processes that identify new types of routing behaviors, knowledge worker behaviors, knowledge worker session behaviors, and/or the like. The routing/business rules may be based on the intent implied by Vector Directory Number (VDN), telephone numbers, IVR system(s) 121, and/or the like.

The IVR system(s) 121 can be any hardware coupled with software that can provide interactive voice communications with users of the user communication devices 101A-101N. The IVR system(s) 121 may comprise different menus that allow a user to identify how the user can be serviced by the contact center 120. For example, the user may select to be connected to a contact center queue for supporting a specific type of product. In some examples, an automated system may provide the information the user is seeking and escalation to a knowledge work is not required (e.g., self-service).

Figure 3:
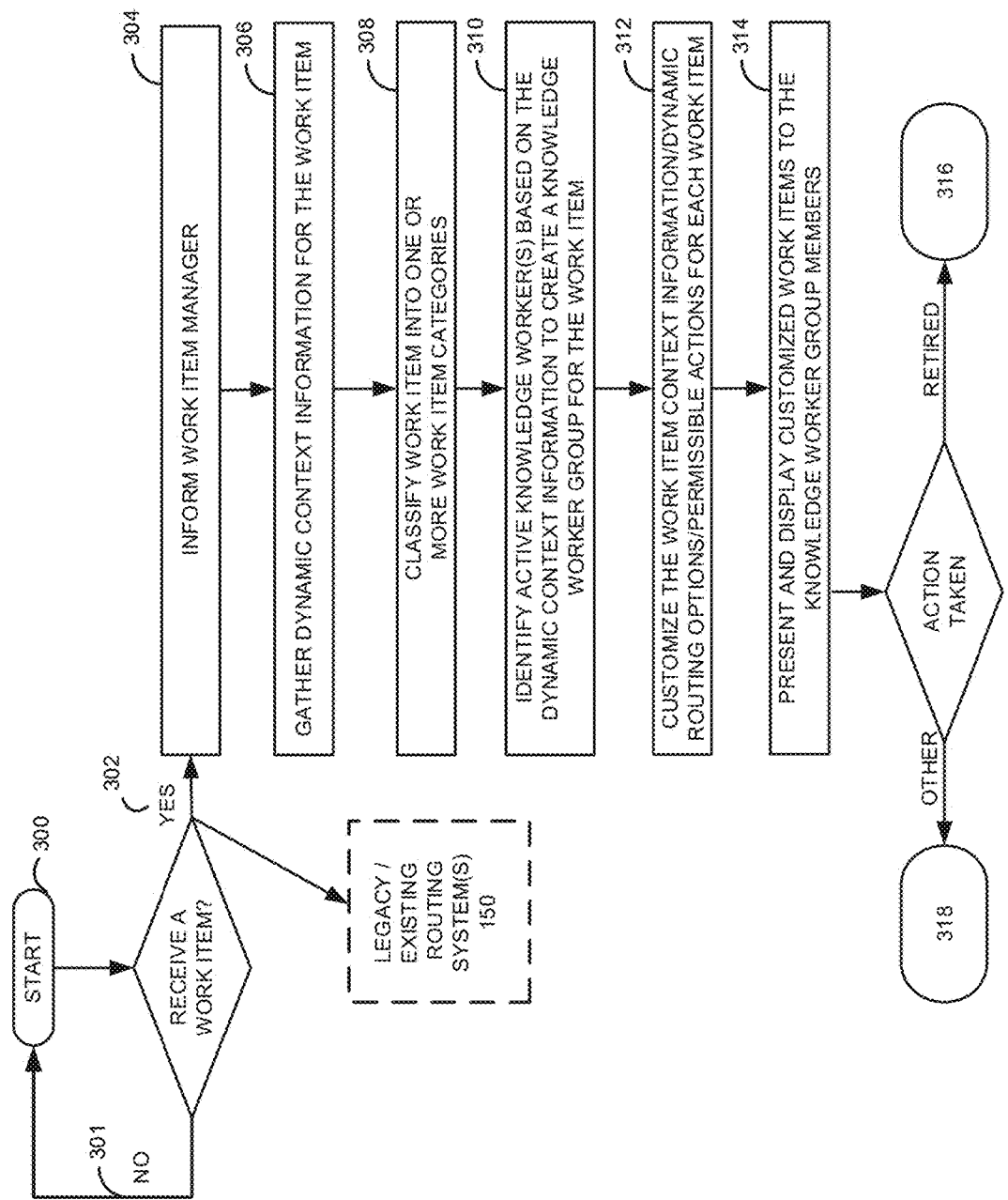
FIG. 3 is a flow diagram of dynamically augmenting the routing and processing of work items in a contact center using context from knowledge workers and other sources.
Figure 4:
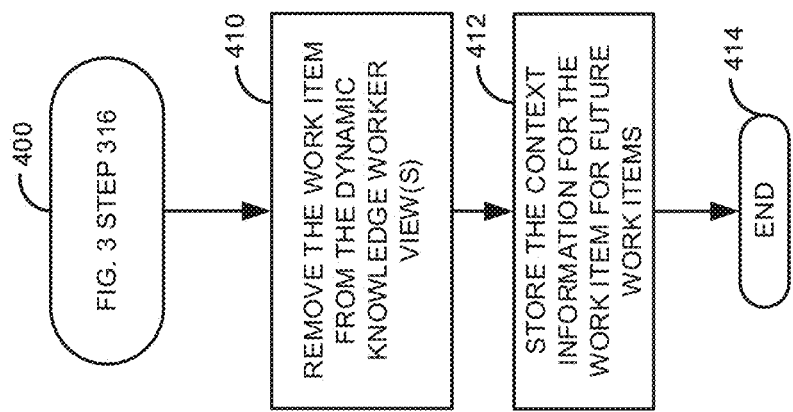
FIG. 4 is a flow diagram illustrating the retirement of a work item in a contact center in accordance with the present disclosure.
Figure 5:
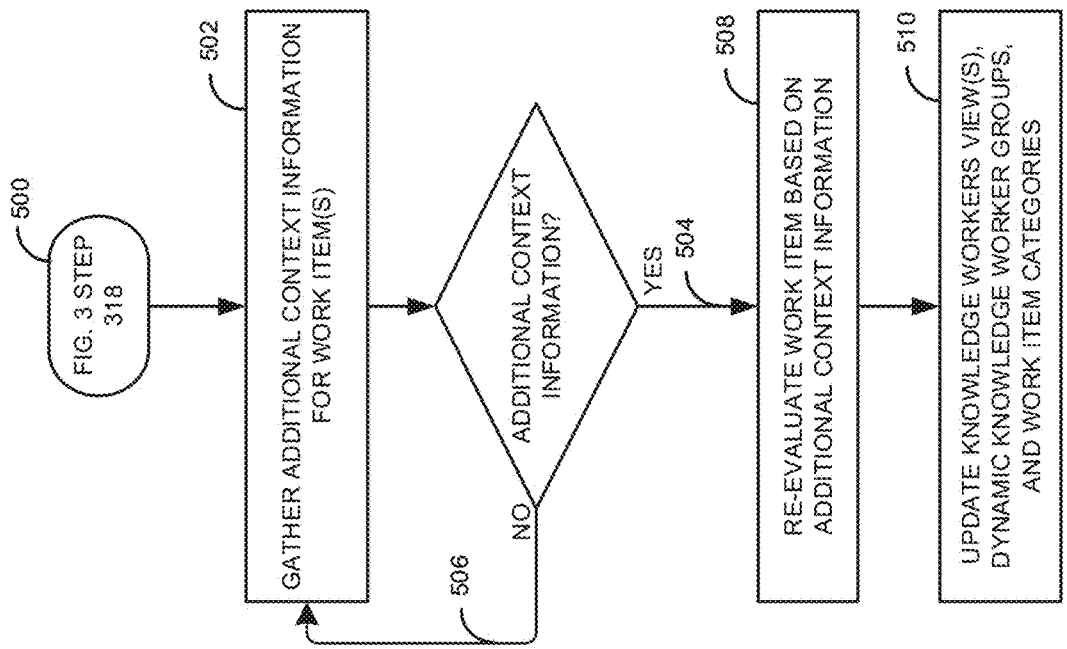
FIG. 5 is a flow diagram illustrating adding context to a work item and dynamically re-evaluating the work item based on additional context information in accordance with the present disclosure.

Illustratively, modules 121, 122, and 124-128 are stored-program-controlled entities, such as a computer or microprocessor, which performs the method of FIGS. 3-6 and the processes described herein by executing program instructions stored in a computer readable storage medium, such as a memory (i.e., a computer memory, a hard disk, and/or the like). Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

FIG. 2 is a block diagram of showing example views in accordance with the present disclosure. The knowledge worker views 200A-200N illustrate the various work items that the system (e.g., work item manager 124) determines are relevant and viewable for each knowledge worker 131A-131N. For example, knowledge worker view 200A may be associated with knowledge worker 131A and knowledge worker view 200N may be associated with knowledge worker 131N. In some embodiments, the view a knowledge worker sees is related to the work item pool and/or dynamic work item group the knowledge worker is in. Each work item view contains N number of work items. Each work item is associated with at least one work item group and a knowledge worker sees the work items from one or more work items groups.

As illustrated in FIG. 2, knowledge worker view 200A lists work items 201A-201D and view 200N shows work items 201A and 201D-201F. Although knowledge workers 131A and 131N may be in the contact center 120 they each have a customized/dynamic view of the work items in the contact center 120. The system further determines which actions are available for each work item for each knowledge worker. For example, not all actions are available for all work items for all knowledge workers that may view the work item. As illustrated in FIG. 2, work item 201A has different actions available in the different knowledge worker views. Knowledge worker view 200A for work item 201A includes the actions, select, schedule call back, send to voicemail, add context, and show available context. In contrast, in the knowledge worker view 200N, the available actions for work item 201A include add context and show available context. Although, not all actions will be available for all work items depending on the knowledge worker, a knowledge worker will generally be able to add context and show available context for all work items. The knowledge worker views 200A-200N are dynamically updated whenever the context of a work item is updated.

Work item 201A comprises a voice call from Jane Doe, she has been waiting for 4 minutes 10 seconds, she previously contacted the contact center on May 11, 2019, and the IVR system 121 may have determined she is calling regarding her account. As illustrated in FIG. 2, although work item 201A is listed in both knowledge worker view 200A and also in knowledge worker view 200N, knowledge worker 131A has different available commands (i.e., select, schedule call back, send to voicemail, and add context) than knowledge worker 131N (i.e., add context). Specifically, knowledge worker 131N is unable to select the work item as illustrated by the dotted lines around the select command button. This may be due to various factors. In some embodiments, commands available to a particular knowledge worker may vary depending on the level of experience, title, etc. For example, a supervisor knowledge worker may have different commands compared to a non-supervisor knowledge worker. In other embodiments, the available commands may vary depending on the status of the work item. For example, a work item that has been selected by another knowledge worker may not be selected by another knowledge worker. In another example, if the work item has been escalated to a supervisor, a knowledge worker may not select the work item.

Work item 201B, which is only in knowledge worker 131A's view 200A, comprises an email communication from Jack Johnson, which was received 3 minutes and 41 seconds ago, Mr. Johnson has forgotten his password, and is denoted as a gold customer. Knowledge worker 131A has several options to handle this work item: select, send link to reset password, and add context. For example, Mr. Johnson may have worked through the IVR system 121 to provide the information that he has forgotten his password. Knowledge worker 131A may quickly handle this work item by sending Mr. Johnson a link to reset his password. Work item 201B is not shown on knowledge worker view 200N for knowledge worker 131N, so knowledge worker 131N is not selected to interact with work item 201B.

Work item 201C comprises a voice call from Chen Lee, who has been on hold for 2 minutes and 15 seconds, the keywords indicate that Mr. Lee is calling about missing money in his bank account. Knowledge worker 131A has several options to interact with the work item 201C, select, transfer to a supervisor, and add context. For example, knowledge worker 131A may choose to add context to the work item before transferring it to her supervisor. In some embodiments, after knowledge worker 131A adds context to work item 201C, the system re-evaluates the work item, and it may then appear in other knowledge workers' views.

Work item 201D comprises a video call from Sally Jones, she has been on the line for 1 minute and 14 seconds and is calling about a new loan. As shown in FIG. 2, knowledge worker 131A and 131N both have the same options (i.e., select, transfer to the loan queue, show all context, and/or add context.

Work item 201E comprises a chat session from Krish Kumar, that has been completed/retired, Mr. Kumar contacted the contact center 120 regarding changes in the account site. Although work item 201E has been completed, knowledge worker 131N is still able to add context to this work item. For example, knowledge worker 131N may wish to go back to work item 201E to add notes after he completes the current call he is on.

Work item 201F comprises a video call from Hal Smith, who is connected to knowledge worker James Egan, and is calling regarding a new loan. As the caller is already connected to a knowledge worker, the options to select and transfer to the loan queue are not available as illustrated by the dotted lines. However, knowledge worker 131N is able to view and add context to this work item.

FIG. 3 is a flow diagram illustrating a process for augmenting the routing of work items dynamically using context for knowledge workers 131A-131N in a contact center 120 and the signaling between the communication manager and the work item manager.

The process starts in step 300. The contact center 120 receives a work item, in step 302. For example, a user may call dial a VDN. The call is sent to the IVR system to gather initial information (e.g., context data). In other examples, the user initiates a chat session with the contact center 120. Digital channel contacts may be routed to work item manager (step 304), while voice channel contacts may be routed to the work item manager and to legacy/existing routing system(s) 150. The legacy/existing routing system(s) 150 may or may not be included, as indicated by the dotted lines around the system. For example, voice communications may be routed to a communication manager in the legacy/existing routing system(s) 150 in parallel to the processing by the work item manager. If there is no work item (step 301), the process returns to start (step 300) and waits for a work item to be received.

In step 306, the system gathers context information for the work.

The work item manager 124 classifies the received work item into one or more dynamic work item categories (step 308). The work item categories may be initialized/identified ahead of time, and/or managed dynamically as the system receives and processes work items. The work item categories can be visualized as a lava lamp, where the different work item categories may split and/or re-form depending on the context. For example, work item categories may come into being from nothing, a work item category may split to into two work item categories, or multiple work item categories may be combined into a single work item category. Advantageously, the work item categories are managed dynamically, whether the work item category is initialized with the system (e.g., feeder work item categories) or generated by the system after processing work items.

In step 310, the work item manager 124, identifies active knowledge worker(s) 131A-131N based on the dynamic context information to create a knowledge worker group for the work item. For example, after the active knowledge workers are identified, the work item (after it is customized in 0079) is added to the dynamic knowledge worker view for the identified knowledge workers The work item manager 124 customizes the work item context information/dynamic routing options and permissible actions for each work item for each identified knowledge worker, in step 312. In step 314, the work item manager 124 presents a customized knowledge worker view for each knowledge worker, which displays the work items that are identified for each knowledge worker. Once a work item is presented to a knowledge worker, the knowledge worker may add context and/or take action on that work item. The knowledge worker may retire the work item (step 316) or take another action (step 318). Retirement of a work item (step 316) is further illustrated in FIG. 4. In some examples, the other action (step 318) may to be to add context to the work item, further illustrated in FIG. 5. Context information may be added by knowledge workers, identified knowledge articles, and/or other resources in the contact center 120.

Context information may be obtained in various other ways. For example, the system may monitor incoming and/or outgoing communications with the contact center 120. The system may monitor voice, video, IM, email, text, and/or virtual reality communications for key words to identify trends that are occurring. For instance, the system may identify that there is a specific type of problem in a newly released video game serviced by the contact center 120 by identifying keywords (e.g., the name of the video game, the word "problem," and the phrase "cannot complete level five") in communications coming into the contact center 120. The keywords may trigger an action (e.g., to reconfigure routing of communications, creating new work item categories, adding knowledge workers, creating new commands in the UI) based on a number of keyword hits (i.e., a threshold). In addition, additional information may be used in conjunction with the keywords. For example, the same problem being discussed on a social media network and also in a news feed may be used along with the keyword hits to identify the problem.

The above discussion describes various systems and ways that information may be captured. One of skill in the art would recognize that system may use various combination of what is discussed above to dynamically reconfigure the contact center 120 to manage an emerging trend.

To further illustrate the process of FIG. 3, consider the following example. The contact center 120 sells and provides technical support for bicycles. The contact center 120 supports many types of bicycles, with many different types of parts. In some examples, initial work categories may comprise types of bicycles, mountain, road, etc. Bicycles have many different parts, so sub-categories may include frame, pedals, gears, wheels, brakes, etc. In some embodiments, some of the work item categories are known and created beforehand, while other work item categories are developed as work items are received/processed. For example, initially there may be a work item category for brakes, as work items are received, the system adds additional work item categories for the different various types of brakes, so sub-work item categories under brakes may include caliper and disk. The sub-category "caliper," may include cantilever and V Brake and the sub-category disk may include hydraulic and mechanical. A particular knowledge worker may know that hydraulic brakes fail at a certain altitude and notice that a particular caller is calling from Colorado regarding hydraulic brakes. Although the knowledge worker may not be handling the work item related to the brakes, the knowledge worker may add context about the altitude issue to the work item.

FIG. 4 is a flow diagram of retirement for a work item in a contact center 120.

The process starts at step 400, which begins from step 316 from FIG. 3. A knowledge worker retires a work item. If the work item is retired (step 316) the work item is removed from the dynamic knowledge worker views (step 410). Once a work item has been retired, the one or more work item categories associated with the work item are updated (step 412) (e.g., storing the work item context information in the associated work item categories). Additionally, knowledge articles may be created as a result, these knowledge articles may also be stored. In some embodiments, the stored context information is used by the context learning module 128 in order to adjust the work item categories and/or association of work items to work item categories. The process ends at step 414.

FIG. 5 is a flow diagram for adding context information to a work item in a contact center 120. The process of FIG. 5 is an expanded view of step 318 of FIG. 3. The process starts in step 500. A knowledge worker 131A-131N may add additional context information to a work item. For example, in knowledge worker view 200A, knowledge worker 131A selects the "add context" button for work item 201C (step 502). For example, during an offline discussion with another knowledge worker in the contact center 120, knowledge worker 131A learns about an error in the system that affects certain accounts. The knowledge worker 131A may add this information as context information to the work item.

After knowledge worker 131A adds the additional context information to the work item, the system (work item manager 124) re-evaluates the work item based on the additional context information, in step 508. In step 510, the system (work item manager 124) updates the dynamic knowledge worker views (e.g., knowledge worker views 200A-200N). For example, the work item may be removed/added from knowledge worker views 200A-200N based on the additional context information. Alternatively, or additionally, knowledge workers may be added/removed for work item categories and/or knowledge worker groups. For example, if knowledge worker Fred adds context to a work item by transferring the work item to another knowledge worker Bob, and Bob was not originally presented with the work item, the system may add Bob to one or more of the work item categories that is associated with said work item.

Figure 6:
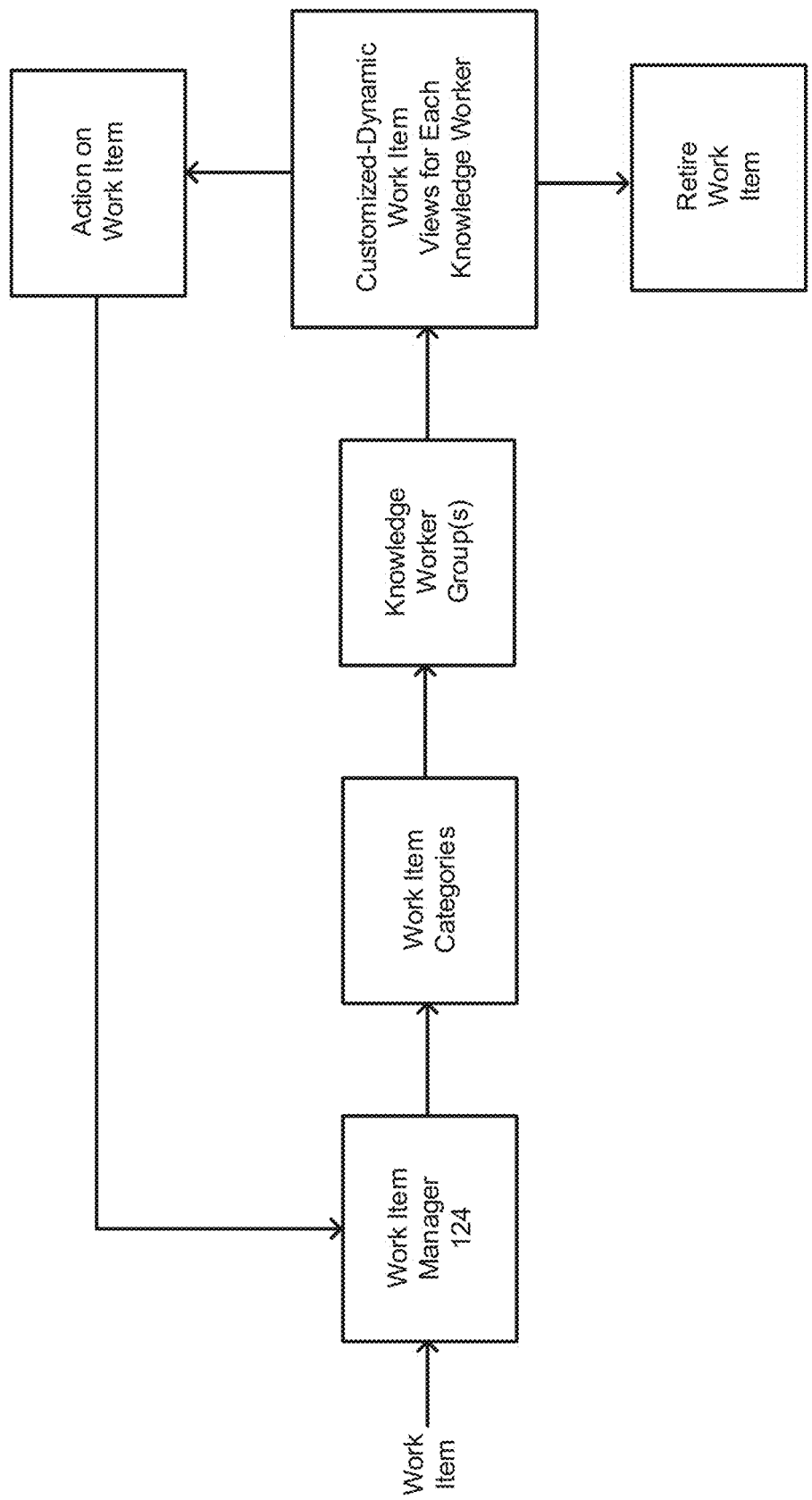
FIG. 6 is a block diagram illustrating the workflow of a work item in accordance with the present disclosure.

FIG. 6 illustrates a block diagram of the workflow for a work item in the augmented routing system 100. As illustrated, the work item enters the system and is routed to the work item manager 124. The work item manager 124 dynamically adds the work item to one or more work item categories. The work item categories may be dynamically created based on the received work item. The work item manager 124 identifies active knowledge workers for the work item based on the work item categories. The work item manager 124 generates dynamic knowledge worker views for each knowledge worker based on the work items assigned to each knowledge worker. For example, if a first knowledge worker is identified for work items A, B, C, and D, the customized knowledge worker view for the first knowledge worker will display work items A, B, C, and D. For work items A, C, D, a second knowledge worker is also identified. The customized knowledge worker view for the second knowledge worker will include the work items A, C, and D, but not work item B. If the first knowledge worker, selects work item C and add context, the work item manager 124 will re-evaluate the work item C. The re-evaluation of work item C may result in the work item C being added and/or removed for work item categories, which may result in the work item C being added/removed for a knowledge worker view. Each time an action (e.g., add context, transfer, select, retire, etc.) is taken on a work item, the work item will be re-evaluated.

FIGS. 7A-D are block diagrams illustrating an example action sequence in a contact center 120 for work items using context information for dynamic routing in accordance with the present disclosure.

Figure 7A:
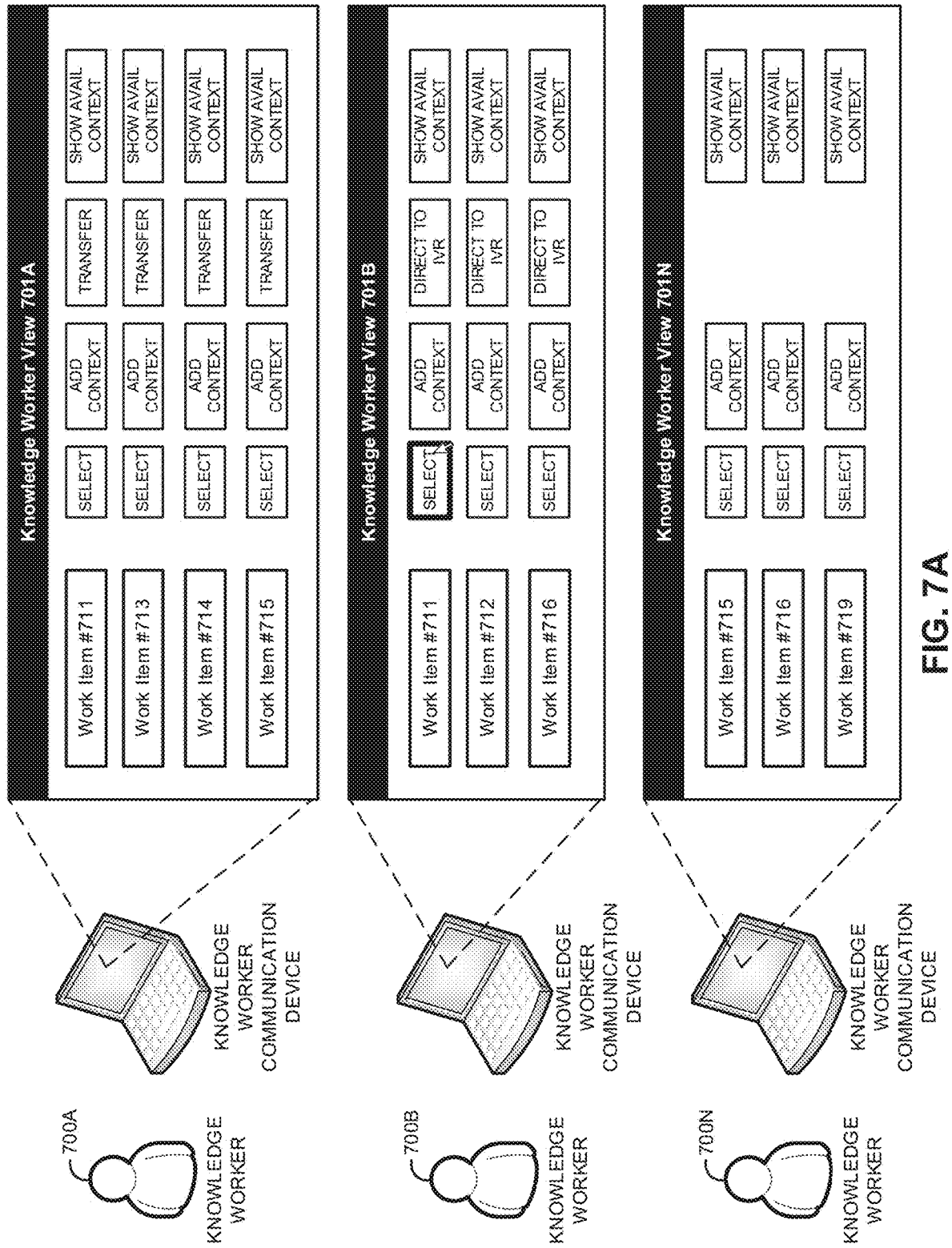

FIG. 7A illustrates knowledge worker views 701A-701N, associated with knowledge workers 700A-700N. Note FIGS. 7A-7D are only an illustrative example of what a knowledge worker view may look like. The actual knowledge worker views may be much richer in appearance and the actions available could be many more or less than what is shown. Further, the actions available would contain domain/business specific elements. The different knowledge workers have different knowledge worker views based on the work items that are displayed to the knowledge worker, the knowledge workers s also have different actions based on their permissions.

As illustrated, view 701A includes work items 711, 713, 714, and 715, and controls for select, add context, transfer, and show all context. These may be the controls available for the knowledge worker and/or dynamic work group associated with view 701A. View 701B includes work items 711, 712, and 716, and controls for select, add context, and direct to IVR (e.g., IVR system(s) 121). View 701N includes work items 715, 716, 719, and controls select, add context, and show all context. For example, views 701A-701N may be associated with knowledge workers with different levels of permissions (e.g., supervisor, regular, knowledge worker, etc.). Knowledge worker 700B selects work item 711, resulting in the transition to FIG. 7B.

Figure 7B:
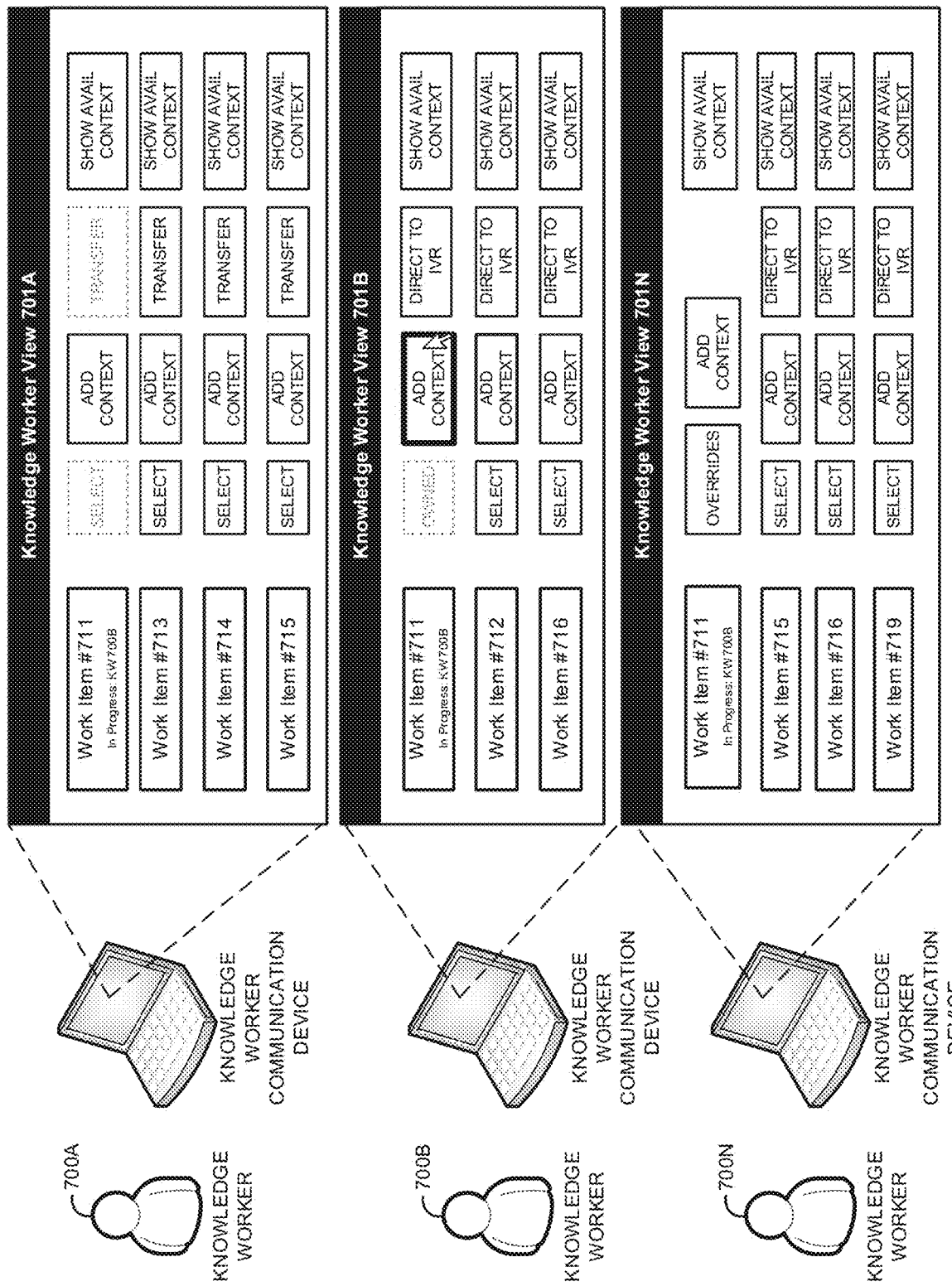

In FIG. 7B, the knowledge worker views 701A-701N now show work item 711 with information that the work item 711 has been selected the knowledge worker associated with view 701B (e.g., knowledge worker 700B). As illustrated, in knowledge worker view 701A, work item 711 can no longer be selected by knowledge worker 700A, however, knowledge worker 700A can still add context even though the work item has been selected and is in progress with another knowledge worker. Further, in knowledge worker view 701N, the work item 711 has new options/action (e.g., override), which may allow the knowledge worker 700N (e.g., a supervisor) to take over the work item 711.

Knowledge worker 700B enters a control to add context to work item 711. In response, the knowledge worker views transition to FIG. 7C.

FIG. 7C illustrates context detail for work item 711. Here, there is a window 720 that listed details for work item 711 and window 721 where the knowledge worker can enter additional context information for the work item 711. The knowledge worker has the opportunity to update context in a variety of ways. They can enter freeform text about the work item that will be analyzed by the AI system, they can take a variety of other actions as well such as (in this example) reference knowledge articles, attach URLs, associate another work item that might be related, change the priority of the work item, assign the work item to another knowledge worker, etc. The ellipses indicate that there are many actions that are possible based on administration and on the knowledge worker's permissions.

In this case, the knowledge worker 700B enters some freeform text, indicated by the italicized text. After the knowledge worker finishes entering the text, he clicks "update context," which causes the engine (e.g., work item manager) to reevaluate the work item resulting in an update to the customized knowledge worker views 701A-701N as shown in FIG. 7D.

Figure 7D:
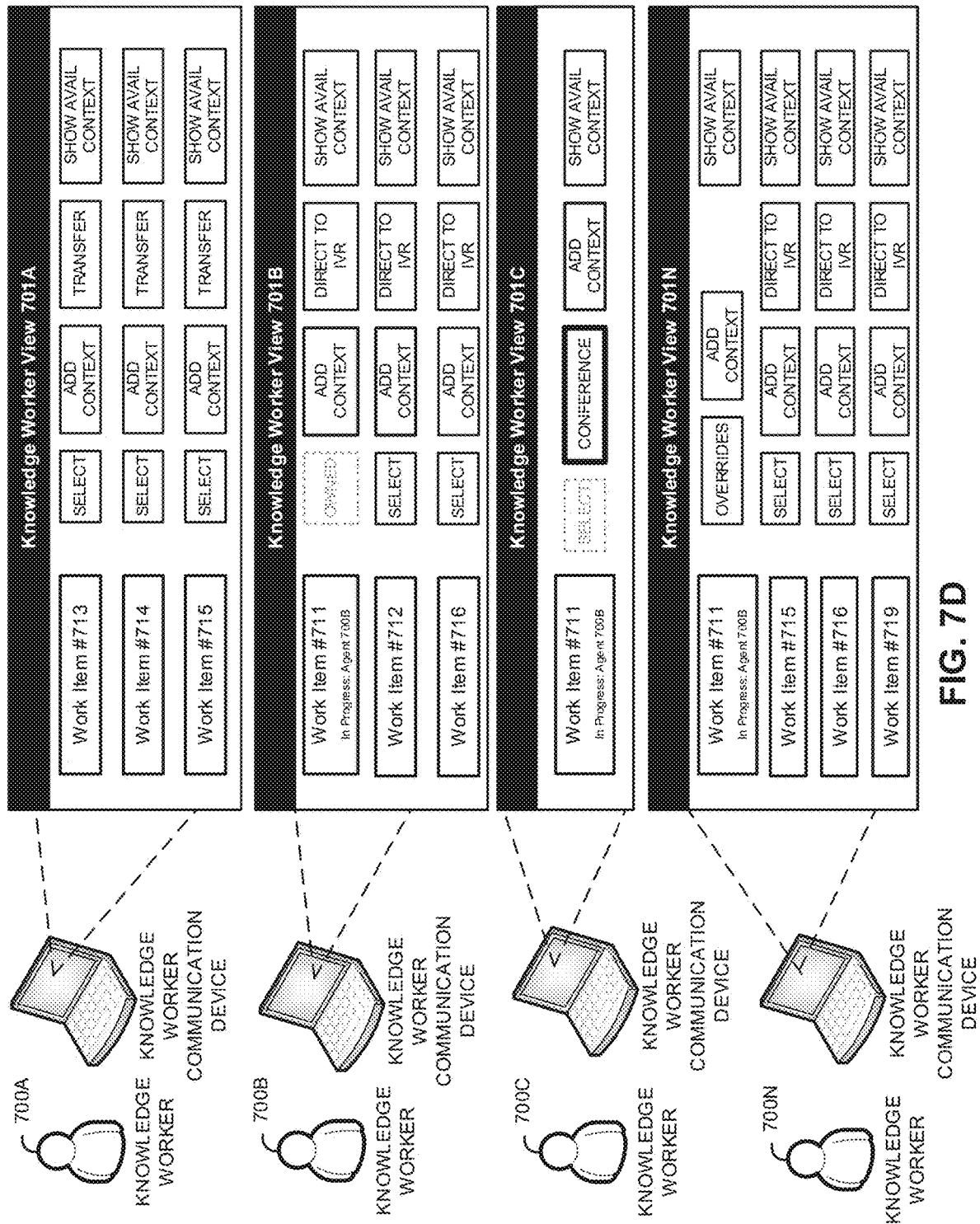

After the system re-evaluates the work item 711 after the context information has been added, the knowledge worker views 701A-701N are updated as illustrated in FIG. 7D. As illustrated, work item 711 has been removed from the view 701A and added to the view 701C. Previously, knowledge worker 700C had no work items displayed, but perhaps 700C is "John Doe" who was mentioned in the context update in FIG. 7C. Knowledge worker 700C is now considered a relevant member of the dynamic group for work item 711. Perhaps knowledge worker 700C associated with dynamic knowledge worker view 701C sees work item 711, views the available context, and decides they can add value and requests to be conferenced onto the active work item 711 (assuming they have such permission).

FIG. 8A illustrates a block diagram of example folders in a context enrichment, in accordance with the present disclosure. This figure intended to show a primitive representation of what retired work items 801 may look like. The augmented routing system allows work items to be examined, reviewed, and the context to be updated even after the work item has been retired. This allows the routing system to be used for all sorts of analytics, generating knowledge articles, pattern searching, customer pattern/satisfaction, and other BI/CRM actions. A knowledge worker might click on the "Today" folder to see a list of work items retired today (that this knowledge worker has permission to see). This would transition to something like FIG. 8B.

For example, context information may be added at any stage of the work item lifecycle. For example, a knowledge worker may add context information while the work item is in queue, while the work item is being handled, and/or after the work item has been retired. For example, "Active" work items may include work items in queue and/or being handled by a knowledge worker. Closed or retired work items may be organized by day, week, month, etc. A knowledge worker may review closed/retired work items to add context information.

FIG. 8B represents a trivial example to illustrate the present disclosure. The actual content displayed and actions available would depend on many factors including the domain/business, knowledge worker permissions, administration, etc. Here we see details of work items retired today as a result on clicking on the "Today" folder in FIG. 8A.

Note that relevant elements are underlined, these are hyperlinks that can be clicked to drill down into further detail or to link to other information. For example, clicking on a customer phone number might call that customer, clicking on a company name might pull up detailed info about that company including list of associated work items, clicking on resolution might give detailed information including Knowledge Worker's notes.

There are also additional buttons (based on the work item and permissions of knowledge worker using the interface). These may include things like using the information in the work item to generate a template for a new Knowledge Article (KA) or an option to remove the work item from the AI Engine's consideration.

Most importantly, even after a work item is retired, context can still be added to the work item. Although adding context to a work item after it's been retired, will not cause the system to re-evaluate the work item and regenerate the dynamic knowledge worker views, adding context after the work item is retired will cause the AI engine to use that information in forming future work item categories (or updating existing work item categories), work item groups, identifying active knowledge workers, generating and/or updating knowledge articles, and making applicable decisions. For example, adding/removing knowledge workers and/or knowledge articles to work item categories.

Figure 9:
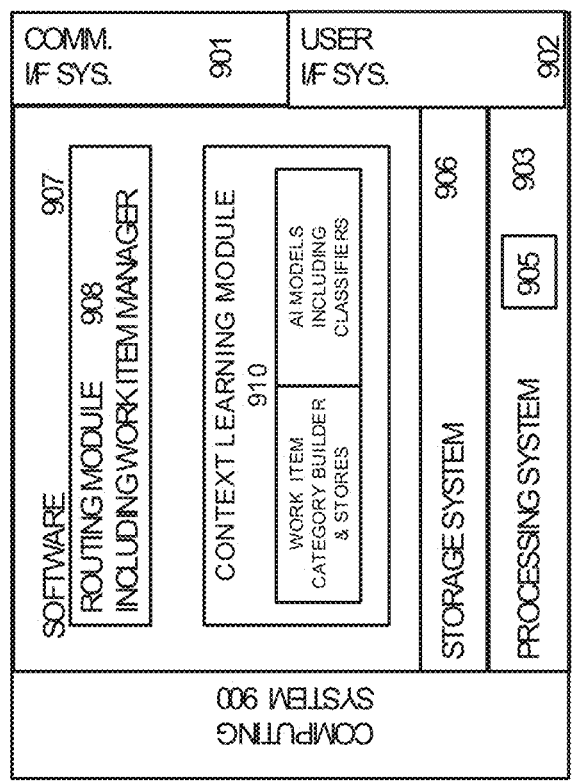
FIG. 9 is a block diagram illustrating a computing device for dynamic routing in a contact center using context information in accordance with the present disclosure.

FIG. 9 illustrates computing system 900 used to augment routing in a contact center 120 using context information and iterative artificial learning as described herein, according to one implementation. Computing system 900 is representative of any computing system or systems with which the various operational architectures, processes, scenarios, and sequences disclosed herein for providing contextual routing in a contact center.

Computing system 900 is an example of contact center 120 and/or work item manger 124, although other examples may exist. Computing system 900 comprises communication interface 901, user interface 902, and processing system 903. Processing system 903 is linked to communication interface 901 and user interface 902. Processing system 903 includes a microprocessor and/or processing circuitry 905 and storage system 906 that stores operating software 907. Computing system 900 may include other well-known components such as a battery and enclosure that are not shown for clarity. Computing system 900 may comprise a server, a user device, a desktop computer, a laptop computer, a tablet computing device, or some other user communication apparatus.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In some implementations, communication interface 901 is configured to communicate with other end user devices, wherein the communication interface is used to transfer and receive work items for a contact center 120.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises a microprocessor and other circuitry that retrieves and executes operating software 907 from storage system 906. Storage system 906 may include volatile and nonvolatile, removable and non-removable media implemented in any method or technology for storage of information, such as computer readable instructions, data structures, program modules, or other data. Storage system 906 may be implemented as a single storage device but may also be implemented across multiple storage devices or sub-systems. Storage system 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold storage system 906 and portions of communication interface 901 and user interface 902. Operating software 907 comprises computer programs, firmware, or some other form of machine-readable program instructions. Operating software 907 includes context learning module 910, which includes work item category builder and stories and AI modules classifiers, although any number of software modules within the application may provide the same operation. Operating software 907 may further include an operating system, utilities, drivers, network interfaces, applications, or some other type of software. When executed by processing circuitry 905, operating software 907 directs processing system 903 to operate computing system 900 as described herein.

In at least one implementation, routing module 908, including instructions to implement a work item manager, when read and executed by processing system 903, directs processing system 903 to route work items in a contact center in accordance with the present disclosure. Context learning module 910 when read and executed by processing system 903, directs processing system 903 to gather context information for work items and route/group/re-evaluate work items based on the context information. AI models allows the system to iteratively learn and adapt contact center routing based on context information.

It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a contact center comprising: a microprocessor; and a computer readable medium, coupled with the microprocessor and comprising microprocessor readable and executable instructions that, when executed by the microprocessor, cause the microprocessor to: receive, via a network, a work item into the contact center; gather initial context information for the received work item; classify the work item into one or more work item categories; identify one or more active knowledge workers based on the context information and/or one or more work item categories; generate and display a customized knowledge worker view for each identified one or more knowledge workers; receive input from at least one of the one or more knowledge workers that indicates an action on the work item; and in response to the action on the work item, re-evaluate the work item, and update each customized knowledge worker view based on the re-evaluation.

Aspects of the above contact center include instructing an Interactive Voice Response (IVR) system to gather the initial context information for the received work item.

Aspects of the above the contact center wherein the action on the work item comprises adding context information to the work item.

Aspects of the above the contact center wherein the action on the work item comprises offering a callback to a user associated with the work item.

Aspects of the above the contact center wherein the action on the work item comprises escalating the work item to a supervisor.

Aspects of the above the contact center wherein the action on the work item comprises transferring the work item to a specific knowledge worker for handling.

Aspects of the above the contact center wherein the action on the work item comprises engaging a team conference session to work on the work item.

Aspects of the above the contact center wherein the action on the work item comprises sending the work item to an automated system to gather additional information.

Aspects of the above the contact center wherein the network comprises a digital channel and the work item comprises one of an email, a chat message, or a video call.

Aspects of the above the contact center wherein the network comprises a voice channel and the work item comprises one of a voice call.

Embodiments include a method to augment routing in a contact center, the method comprising: receiving, via a network, a work item into the contact center; gathering initial context information for the received work item; classifying the work item into one or more work item categories; identifying one or more active knowledge workers based on the context information and/or one or more work item categories; generating and display a customized knowledge worker view for each identified one or more knowledge workers; receiving input from at least one of the one or more knowledge workers that indicates an action on the work item; and in response to the action on the work item, re-evaluating the work item, and updating each customized knowledge worker view based on the re-evaluation.

Aspects of the above method wherein gathering the initial context information for the received work item comprises instructing an Interactive Voice Response (IVR) system to gather the initial context information.

Aspects of the above method wherein the action on the work item comprises adding context information to the work item.

Aspects of the above method wherein the action on the work item comprises offering a callback to a user associated with the work item.

Aspects of the above method wherein the action on the work item comprises escalating the work item to a supervisor.

Aspects of the above method wherein the action on the work item comprises transferring the work item to a specific knowledge worker for handling.

Aspects of the above method wherein the action on the work item comprises engaging a team conference session to work on the work item.

Aspects of the above method wherein the action on the work item comprises sending the work item to an automated system to gather additional information.

Aspects of the above method wherein the network comprises a digital channel and the work item comprises one of an email, a chat message, or a video call.

Aspects of the above method wherein the network comprises a voice channel and the work item comprises one of a voice call.

What is claimed is:

1. A contact center comprising:
    a microprocessor; and
    a computer readable medium, coupled with the microprocessor and comprising microprocessor readable and executable instructions that, when executed by the microprocessor, cause the microprocessor to:
        receive, via a network, a work item into the contact center;
        gather initial context information for the received work item;
        classify the received work item into one or more work item categories;
        identify one or more active knowledge workers based on the initial context information and/or the one or more work item categories;
        generate and display a customized knowledge worker view for each identified one or more active knowledge workers;
        receive input from at least one of the one or more active knowledge workers that indicates an action on the received work item; and
        in response to the action on the received work item, re-evaluate the received work item and update each customized knowledge worker view based on the re-evaluation.

2. The contact center of claim 1, wherein the microprocessor readable and executable instructions further cause the microprocessor to:
    instruct an Interactive Voice Response (IVR) system to gather the initial context information for the received work item.

3. The contact center of claim 1, wherein the action on the work item comprises adding context information to the work item.

4. The contact center of claim 1, wherein the action on the work item comprises offering a callback to a user associated with the work item.

5. The contact center of claim 1, wherein the action on the work item comprises escalating the work item to a supervisor.

6. The contact center of claim 1, wherein the action on the work item comprises transferring the work item to a specific knowledge worker for handling.

7. The contact center of claim 1, wherein the action on the work item comprises engaging a team conference session to work on the work item.

8. The contact center of claim 1, wherein the action on the work item comprises sending the work item to an automated system to gather additional information.

9. The contact center of claim 1, wherein the network comprises a digital channel and the work item comprises one of an email, a chat message, or a video call.

10. The contact center of claim 1, wherein the network comprises a voice channel and the work item comprises one of a voice call.

11. A method to augment routing in a contact center, the method comprising:
    receiving, via a network, a work item into the contact center;
    gathering initial context information for the received work item;
    classifying the received work item into one or more work item categories;
    identifying one or more active knowledge workers based on the initial context information and/or the one or more work item categories;
    generating and display a customized knowledge worker view for each identified one or more active knowledge workers;
    receiving input from at least one of the one or more active knowledge workers that indicates an action on the received work item; and
    in response to the action on the received work item, re-evaluating the received work item and updating each customized knowledge worker view based on the re-evaluation.

12. The method of claim 11, wherein gathering the initial context information for the received work item comprises instructing an Interactive Voice Response (IVR) system to gather the initial context information.

13. The method of claim 11, wherein the action on the work item comprises adding context information to the work item.

14. The method of claim 11, wherein the action on the work item comprises offering a callback to a user associated with the work item.

15. The method of claim 11, wherein the action on the work item comprises escalating the work item to a supervisor.

16. The method of claim 11, wherein the action on the work item comprises transferring the work item to a specific knowledge worker for handling.

17. The method of claim 11, wherein the action on the work item comprises engaging a team conference session to work on the work item.

18. The method of claim 11, wherein the action on the work item comprises sending the work item to an automated system to gather additional information.

19. The method of claim 11, wherein the network comprises a digital channel and the work item comprises one of an email, a chat message, or a video call.

20. The method of claim 11, wherein the network comprises a voice channel and the work item comprises one of a voice call.

* * * * *